US00RE38061E

(19) United States
(12) Reissued Patent
Ladouceur

(10) Patent Number: US RE38,061 E
(45) Date of Reissued Patent: Apr. 8, 2003

(54) METHOD OF ATTACHING A FASTENING ELEMENT TO A PANEL

(75) Inventor: Harold A. Ladouceur, Livonia, MI (US)

(73) Assignee: FabriSteel Products, Inc., Taylor, MI (US)

(21) Appl. No.: 10/044,163

(22) Filed: Jan. 11, 2002

Related U.S. Patent Documents

Reissue of:
(64) Patent No.: 6,122,816
Issued: Sep. 26, 2000
Appl. No.: 09/244,319
Filed: Feb. 4, 1999

U.S. Applications:

(62) Division of application No. 08/905,305, filed on Aug. 4, 1997, now Pat. No. 5,868,535.

(51) Int. Cl.[7] ..... B21D 39/00
(52) U.S. Cl. ..... 29/509; 29/512; 29/521; 29/524.1; 29/432.1
(58) Field of Search ..... 29/509, 512, 521, 29/524.1, 432.1

(56) References Cited

U.S. PATENT DOCUMENTS 3,640,326 A * 2/1972 Brown
3,754,731 A * 8/1973 Mackal et al.
3,877,133 A * 4/1975 Grube
4,018,257 A * 4/1977 Jack ..... 29/512 X
4,039,099 A * 8/1977 Boxall ..... 29/524.1 X
4,174,559 A * 11/1979 Persik ..... 29/524.1 X
4,557,650 A * 12/1985 Molina
4,627,776 A * 12/1986 Pamer et al.
4,713,872 A * 12/1987 Muller
4,732,518 A * 3/1988 Toosky
4,825,527 A * 5/1989 Ladouceur ..... 29/458 X
4,831,698 A * 5/1989 Muller ..... 29/512
5,020,950 A * 6/1991 Ladouceur
5,092,724 A * 3/1992 Muller
5,207,588 A * 5/1993 Ladouceur et al.
5,237,733 A * 8/1993 Ladouceur et al.
5,564,873 A * 10/1996 Ladouceur et al.
5,644,830 A * 7/1997 Ladouceur et al.
5,868,535 A * 2/1999 Ladouceur ..... 411/181

* cited by examiner

*Primary Examiner*—Gregory M. Vidovich
*Assistant Examiner*—Steven A Blount
(74) *Attorney, Agent, or Firm*—Howard & Howard

(57) ABSTRACT

The method of attaching a fastening element to a metal panel within a panel opening using a die member having an annular concave die cavity. The fastening element includes a tubular riveting portion and a radial flange portion and a fastening portion. The internal and external surfaces of the tubular riveting portion are relatively uniformly inclined toward the radial flange portion such that the thickness of the tubular riveting portion at the free end is less than the thickness adjacent the radial flange portion. In the preferred embodiment, the internal surface of the tubular riveting portion is cylindrical and the external surface is slightly conical tapering inwardly toward the free end to reduce the force required to radially deform the free end of the tubular portion radially outwardly. Further the outer surface of the radial flange portion is generally polygonal having arcuately radially inwardly concave side surfaces spaced by relative thin convex arcuate edge surfaces reducing the force required to drive the flange portion into the panel during final installation of the fastening element. The method of this invention includes driving the free end of the tubular barrel portion through an opening in the panel into the die member, thereby deforming the free end of the barrel portion radially outwardly and deforming the radial flange portion into the panel.

7 Claims, 3 Drawing Sheets

Fig-1
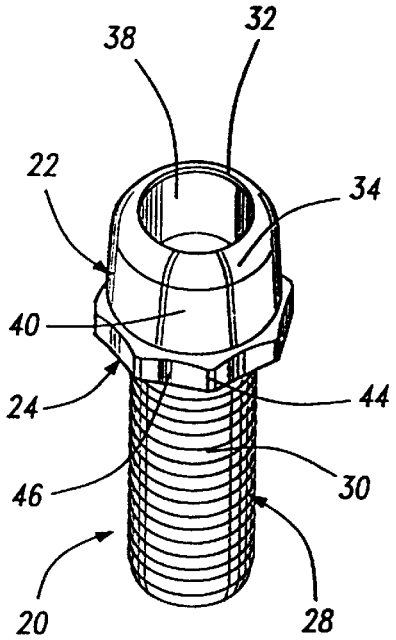
Fig-2
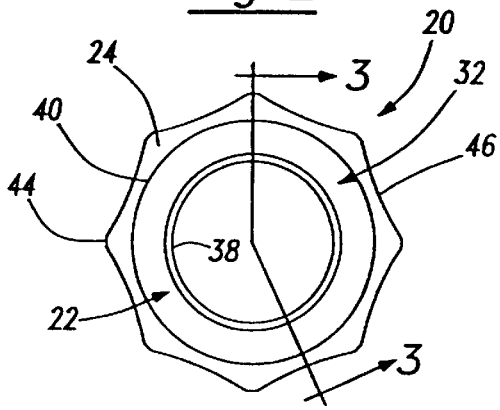
Fig-3
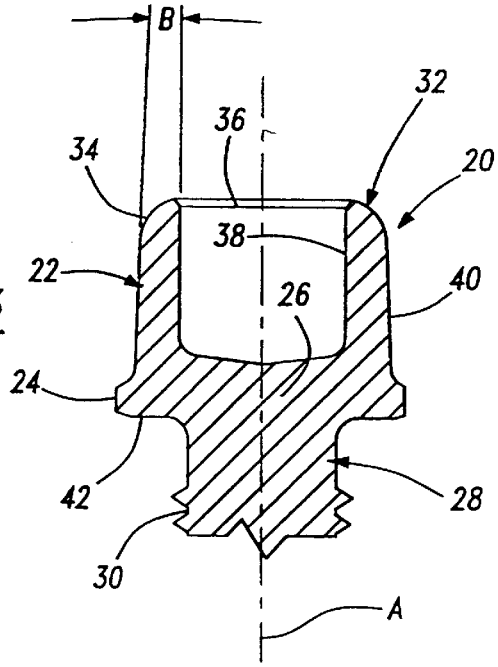
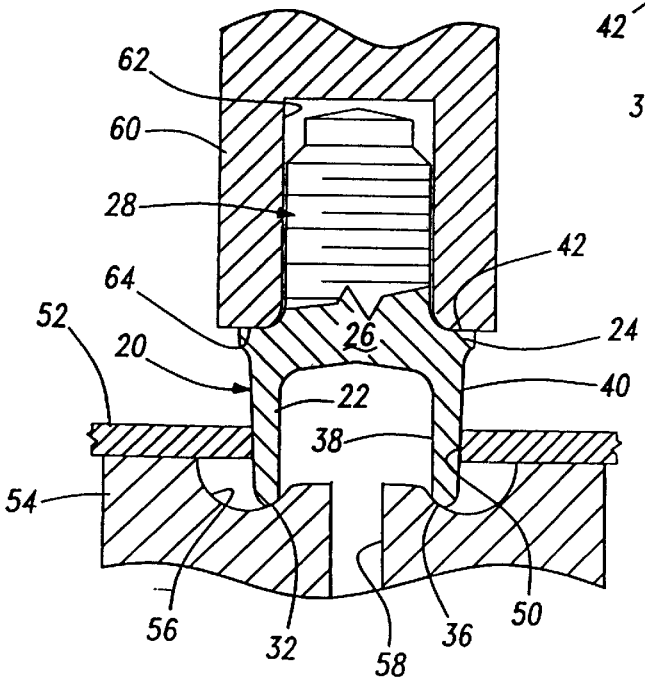
Fig-4

PRIOR FASTENER

METHOD OF ATTACHING A FASTENING ELEMENT TO A PANEL

Matter enclosed in heavy brackets [ ] appears in the original patent but forms no part of this reissue specification; matter printed in italics indicates the additions made by reissue.

This is a divisional of application Ser. No. 08/905,305 filed on Aug. 4, 1997, now U.S. Pat. No. 5,868,535.

FIELD OF THE INVENTION

The present invention relates to an improved self-riveting or self-attaching fastening element, preferably a self-riveting male fastening element such as a stud, bolt or the like, which is permanently attached to a panel in an opening in the panel. More specifically, the present invention relates to a self-riveting fastening element having a tubular riveting portion which is received through an opening in the panel into a concave annular die cavity to permanently rivet the fastening element to the panel.

BACKGROUND OF THE INVENTION

Self-riveting male fastening elements of the type disclosed herein were first developed by Profit Verbindungstechnik GmbH & Co. KG of Germany, a company related to the assignee of the present application, as disclosed in U.S. Pat. No. 5,092,724. The fastening element includes a tubular or annular piercing and riveting portion or barrel portion which in the preferred embodiment pierced an opening in the panel which is then received through the panel opening into a din member having an annular concave die cavity. The die then deforms the free end of the barrel or riveting portion radially outwardly to permanently attach the fastening element to the panel. The fastening element further includes a radial flange portion which is driven into the panel as the free end of the tubular riveting portion is deformed radially outwardly forming a rigid secure installation in a panel. In the preferred embodiment, the fastening element further includes a male fastening portion integral with the radial flange or body portion coaxially aligned with the tubular riveting portion. Female fastening elements of this type were also developed, wherein the body portion includes an internal thread forming a nut-type fastener. Alternatively, the bore may be smooth to receive a self-rolling or self-tapping screw or bolt.

Self-attaching fastening elements of this type have been used extensively particularly in automotive and other applications requiring a secure rigid installation of a fastening element such as a stud, bolt, or nut in a metal panel or plate including body panels, brackets, structural elements and the like. However, self-piercing fastening elements of this type are generally limited to applications where the metal panel has a thickness generally less than about 2.5 mm or 0.098 inches. In automotive applications for example one problem solved by the self-piercing fastener disclosed in the above-referenced U.S. patent was to permanently attach a fastening element in relatively thin panels having a thickness of about 0.031 inches in a continuous operation. Later, fastening elements of this type were developed for permanent attachment of the fastening elements in relatively thick or heavy gauge metal panels as disclosed, for example, in U.S. Pat. Nos. 4,713,872; 5,237,733; and 5,564,873. In applications requiring the installation of a self-riveting fastening element of this type in heavy gauge metal panels having a thickness ranging from about 0.08 to 0.25 inches or greater, an opening configured to receive the tubular riveting portion of the fastening element is first formed in the panel. The tubular riveting portion of the fastening element is then received through the panel opening into a concave annular die cavity and the fastening element is then driven toward the die member which deforms the free end of the tubular riveting portion radially outwardly, permanently riveting the fastening element to the panel. The fastening element may include a radial flange portion which is driven into the panel to entrap the panel portion adjacent the panel opening and forming a flush mounting as disclosed in U.S. Pat. Nos. 5,237,733 and 5,564,873. Alternatively, the body portion may include a conical surface adjacent the tubular riveting portion forming a press fit as disclosed in U.S. Pat. No. 4,713,872. In the most preferred embodiment, however, the body portion includes a radial flange portion forming a more secure rigid fastener and panel assembly.

There are, however, problems in the installation of a self-riveting fastening element of the type described having a radial flange portion for installation in heavier gauge metal panels, particularly, but not exclusively male self-riveting fastening elements. A male self-riveting fastening element, for example, is driven toward the die member by a plunger having an annular end portion which surrounds the male fastening portion as disclosed in the above-referenced U.S. patents. The annular driving surface of the plunger is driven against an annular surface of the radial flange portion of the body portion of the fastening element which significantly deforms the radial flange portion during installation as shown in FIG. 9, described below, because of the force required for installation. As described in the above-referenced U.S. patents, self-riveting fasteners of this type are normally installed in a die press generating several tons of force and the die press may simultaneously form the plate or panel into a contoured shape. Several tons of force are required first to deform the free end of the tubular riveting or barrel portion radially outwardly in the concave arcuate annular die cavity, because of the extreme frictional resistance and large hoop stresses developed. These forces have been reduced by including an internal conical chamfifer surface on the free end of the self-riveting portion and by friction resistant coatings; however, these approaches have not eliminated this problem. Further, the force required to deform the radial flange portion of the self-riveting fastening element into the panel results in further deformation of the radial flange portion during the final installation of the fastening element in the panel.

During installation of a self-riveting fastening element of the type described above, the radial flange portion is deformed by the driving surface of the plunger or ram toward and into the tubular riveting portion and radially, resulting in resulted in fewer structural integrity of the fastening element and panel assembly. This problem has reduced applications of this type of self-riveting fastening element in heavier gauge metal pads and problems following installation. As set forth below, this problem has been solved by the improved self-attaching fastening element of this invention by reducing the force required to install the self-riveting fastening element in a panel, thereby reducing the deformation of the radial flange portion during installation.

SUMMARY OF THE INVENTION

As described above, the improved self-riveting fastening element of this invention is designed for permanent attachment to a metal panel or plate within a panel opening by a die member having an annular concave die cavity. The self-riveting fastening element includes a tubular riveting portion having generally cylindrical internal and external surfaces and a free end. The self-riveting fastening element further includes a radial flange portion integral with the tubular riveting portion opposite the free end having a diameter greater than the tubular barrel portion and adapted to be driven into the panel as the tubular riveting portion is driven through the panel opening into the annular die cavity. Where the self-riveting fastening element is a male fastening element, the radial flange portion forms part of a body portion of the fastening element, which bridges the tubular riveting portion and closes the end of the tubular barrel portion opposite the free end and a male fastening portion such as a stud or bolt is integral with the flange or body portion opposite the tubular riveting portion and preferably coaxially aligned with the tubular riveting portion. An annular drive surface is thus defined around the male fastening portion. Where the self-riveting fastening element is installed in a preformed opening, as will be required for installation in heavier gauge panels, the tubular riveting portion is first aligned with the panel opening, then driven through the panel opening by a plunger into an annular concave die cavity of a die member. The die member then deforms the free end of the tubular riveting portion radially outwardly preferably in a hook or U-shape and the radial flange portion is simultaneously driven into the panel entrapping the panel metal between the radially deformed hook-shaped riveting portion and the flange portion, forming a secured fastening element and panel assembly.

The force required to deform the free end of the tubular riveting portion in the concave die cavity is significantly reduced by reducing the thickness of the tubular riveting portion adjacent the free end, wherein the internal and external surfaces of the generally cylindrical tubular barrel portion are slightly inclined toward the radial flange portion, such that the thickness of the tubular riveting portion uniformly increases from the free end toward the radial flange portion. In the most preferred embodiment of the self-riveting fastening element of this invention, the internal surface of the tubular riveting portion is cylindrical and parallel to the longitudinal axis of the tubular riveting portion and the external surface is sonically tapered toward the free end of the riveting portion. Most preferably, the free end of the tubular riveting portion includes an outer arcuate surface which smoothly blends into the conical external surface providing a smooth transition from the arcuate outer surface into the conical external surface. The cone angle of the external surface is between about one and five degrees or most preferably between two and three degrees. As described more fully below, this relatively simple modification of the tubular riveting portion results in a significant reduction in the force required to deform the free end of the tubular riveting portion radially outwardly of greater than ten percent. The reduction is force required is achieved without significantly reducing the strength of the deformed hook-shaped free end of the tubular riveting portion.

The force required to drive the radial flange portion of the self-riveting fastening of this invention into the panel is reduced by providing a plurality of arcuate radially inwardly concave surfaces on the radially outer or exterior surface of the radial flange portion. This modification reduces the area of the radial flange portion driven into the panel adjacent the opening and further increases the torque required to turn the self-riveting fastening element relative to the panel following installation. Torque resistance is also an important feature of a self-riveting fastening element of the type described herein because the fastening element is utilized to attach a second element to the fastening element and panel assembly. For example, the self-riveting male fastening element of this invention may include an integral threaded bolt portion which extends from the panel. The bolt is then used to attach an automotive component, for example, to the fastening element and panel assembly which is secured in place by a conventional nut. During the engagement of the nut, however, the bolt may be subject to twisting forces, particularly where the nut is cross-threaded or a thread forming nut or bolt is used and a torque wrench is used. The fastening portion may therefore be subject to substantial tensional loads and must be able to withstand turning of the fastening element relative to the panel following installation. In the most preferred embodiment of the self-riveting fastening element, the radial flange portion is generally polygonal having, for example, six or eight sides. The radially inwardly concave surfaces are defined in the side surfaces of the polygonal radial flange portion located between the points or edges. In the most preferred embodiment, the "edges" of the polygonal radial flange portion include a thin convex arcuate surface and the radially inwardly concave surfaces are located between the thin convex arcuate surfaces of the edges. The radially inwardly concave surfaces between the concave arcuate surfaces most preferably have a relatively large radius. The radius of curvature of the concave arcuate surfaces is defined such that the arc is spaced from the external surface of the tubular riveting portion. In the most preferred embodiment, the radius of the arcuate radially inwardly concave surface is greater than the radius of the external surface of the tubular riveting portion.

Other advantages and meritorious features of the self-riveting fastening element of this invention and method of installation will be more fully understood from the following description of the preferred embodiments, the claims and the appended drawings a brief description of which follows.

BRIEF DESCRIPTION OF THE DRAWINGS

FIG. 1 is an end perspective view of a preferred embodiment of a self-riveting male fastening element of this invention;

FIG. 2 is an end view of the embodiment of the self-riveting male fastening element shown in FIG. 1;

FIG. 3 is a partial side cross sectional view of FIG. 2 in the direction of view arrows 3—3;

FIG. 4 is a side partially cross sectioned view of the self-riveting male fastening element of FIGS. 1 to 3 with the fastener located .in panel opening supported on a die member prior to installation on;

DESCRIPTION OF PREFERRED EMBODIMENTS

Figure 5:
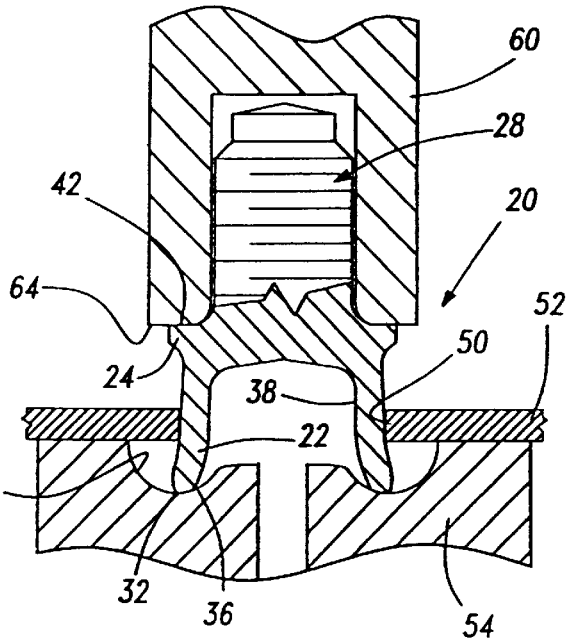
FIGS. 5 to 7 are side partially cross sectioned views of the self-riveting fastening element illustrated in FIGS. 1 to 4 illustrating the installation of the self-riveting male fastening element in a panel.

FIGS. 1 to 3 illustrate a preferred embodiment of the self-riveting male fastening element 20 of this invention The self-riveting male fastening element 20 includes a tubular riveting or barrel portion 22, a polygonal radial flange portion 24 which forms a portion of the body portion 26 as shown in FIG. 3, and a male fastening portion 28 which in the disclosed embodiment is externally threaded a 30 as shown in FIGS. 1 and 3. The tubular riveting portion 22 includes a free end 32 having an arcuate outer surface 34 and an inner conical chamfered surface 36 as best shown in FIG. 3. The tubular riveting portion 22 further includes an internal surface 38 and an external surface 40 which are generally cylindrical. The radial flange portion further includes an annual drive surface 42 which in the disclosed embodiment of the male self-riveting fastening element surrounds the male fastening portion 28. As best shown in FIG. 2, the outer surface of the radial portion is generally polygonal, which in the disclosed embodiment includes eight "edges" 44 and eight side surfaces 46. As described, in the preferred embodiment of the self-riveting fastening element of this invention, the side surfaces 46 include arcuate radially inwardly concave surfaces having a relatively large radius.

The "edges" or corners 44 are most preferably thin convex arcuate surfaces; that is, the surfaces 44 have a relatively short arc length, but all have the same radius generated from the longitudinal axis A of the fastener. In an M10 fastener, for example, the arc length or "width" of the surfaces 44 will be 0.010 to 0.030 inches. These thin convex arcuate surfaces 44 are however important to the control of the fastener during installation. First, fasteners of this type are fed through a flexible plastic tube having an internal diameter only slightly larger than the diameter of the convex arcuate surfaces 44 and these surfaces therefore control the orientation of the fasteners in the feed tube and prevent cocking. Second, the convex arcuate surfaces 44 control the location and orientation of the fastener in the installation head, which is important to properly orient the fastener for installation. The radius of curvature of the concave arcuate surfaces 46 is defined such that the arc is preferably spaced from the external surface 40 of the tubular riveting portion 22, as shown in FIG. 2. Finally, the concave arcuate surfaces 46 terminate short of the "edges," leaving the thin convex arcuate surfaces 44 for control of the fastener. In the preferred embodiment, the radius of the convex arcuate surfaces 44 is greater than the radius of the external surface 40 of the tubular riveting portion 22.

Further, as described above, the generally cylindrical internal and external surfaces, 38 and 40, respectively, of the tubular barrel portion 22 are relatively uniformly inclined toward the radial flange portion 24 such that the thickness of the tubular riveting portion at the free end 32 uniformly increases toward the radial flange portion. Stated another way, the internal and external surfaces 38 and 40 converge toward the free end 32 of the tubular riveting portion 22. In the most preferred embodiment the internal surface 38 is cylindrical and parallel to the longitudinal axis A of the tubular barrel portion 22 and the self-riveting male fastening element 20 in this embodiment, and the external surface 40 is conical tapering inwardly toward the free end 32 and blending smoothly with the arcuate surface 34 as shown in FIG. 3. The cone angle B is preferably between one and five degrees and most preferably between two and three degrees.

Having described a preferred embodiment of the self-riveting male fastening element of this invention, the function and advantages of the improved fastening element will be more fully understood from a description of the method of installation illustrated in FIGS. 4 to 7. As shown in FIG. 4, an opening 50 is first formed in the panel 52 configured and adapted to receive the fastening element 20. In the embodiment shown, the opening 50 is cylindrical or circular having an internal diameter which is greater than the external diameter of the exterior surface 40 of the tubular riveting portion 22 and less than the diameter of the radial flange portion 24. The panel 52 is supported on a die member 54 having an annular concave die cavity 56 coaxially aligned with the opening in the panel. The die member further includes a central relief port 58 because the body portion 26 closes the end of the tubular riveting portion 22 opposite the free end 32 and the port 58 permits exhaust of air during installation of the fastening element 20. The fastening element 20 is installed by a plunger 60 which in the disclosed embodiment includes a cylindrical opening 62 which receives the male stud or bolt portion 28 as shown in FIG. 4. The free end of the plunger includes an annular driving surface 64 which engages the driven surface 42 of the radial flange portion during installation. As described above and more particularly in the above-referenced patents, the fastening element 20 is normally installed in a die press having an installation head attached to one platen of the die press (not shown) and the die member or die button 54 is installed in the opposite die platen. A fastening element is then installed with each stroke of the die press. During installation, the riveting portion 22 is disposed through the opening 50 of the panel 52 such that the inner conical chamfered surface 36 of the free end 32 of the riveting portion 22 engages an inner surface of the annular concave die cavity 56. The fastening element 20 is then ready for installation.

Figure 6:
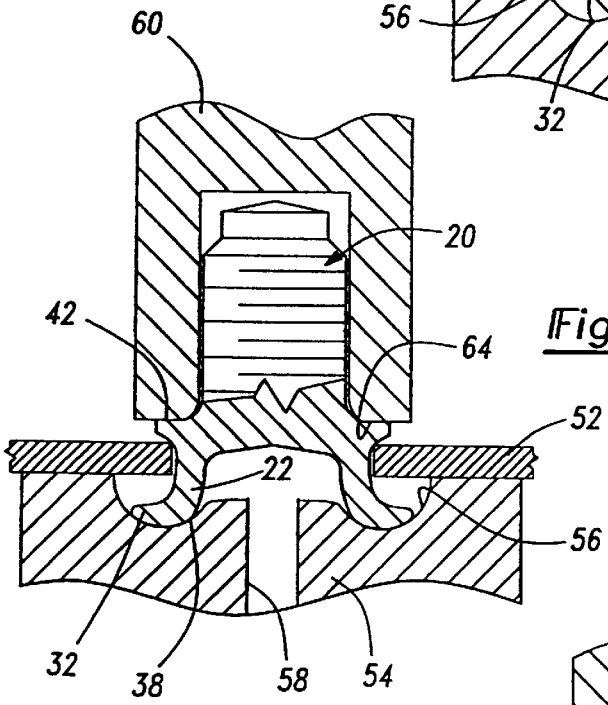
Figure 7:
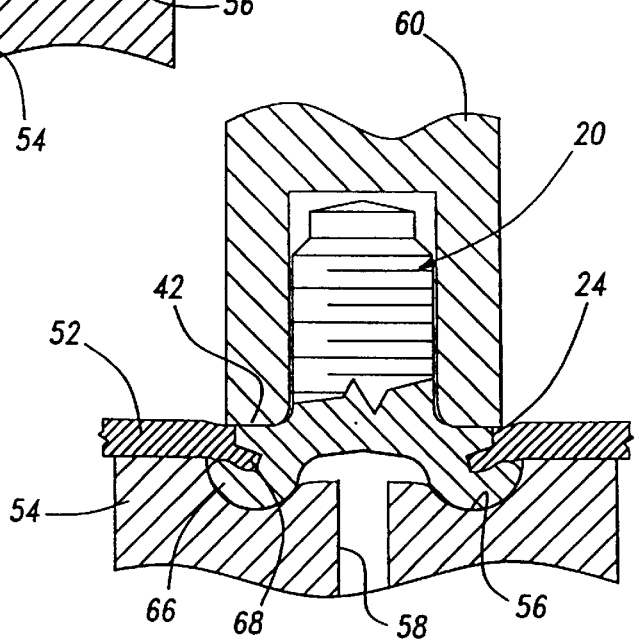

The annular driving surface 64 of the plunger 60 is then driven against the annular surface 42 of the radial flange portion 24 which drives the inner conical chamfered surface 36 of the free end 32 of the riveting portion 22 against the annular concave die cavity 56 as shown in FIG. 5. This deforms the free end 32 of the riveting portion 22 radially outwardly as best shown in FIG. 6. As the free end 32 of the tubular riveting portion is deformed further, the internal surface 38 of the tubular barrel portion 22 is deformed against the annular concave die cavity 56 creating very substantial frictional resistance to further deformation Finally, as shown in FIG. 7, the tubular riveting portion is deformed into a hook-shape 66 and the radial flange portion 24 is deformed into the panel 54 entrapping the portion 68 of the panel adjacent the panel opening. The radial flange portion 24 is not substantially deformed radially outwardly or axially during the final installation of the fastening element 20 in the panel 52, forming a very secure and rigid installation.

Figure 8:
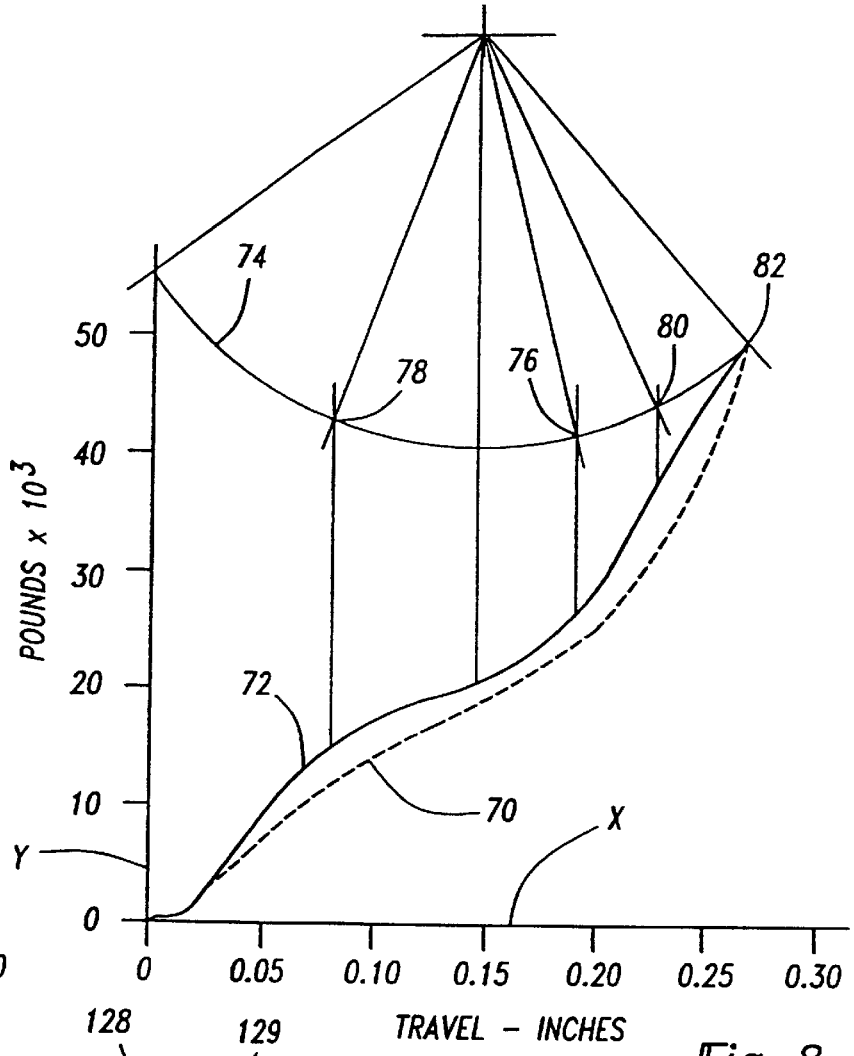
FIG. 8 is a graph comparing the installation forces of the improved self-riveting fastening element of this invention with the prior self-riveting fastening element described above.

FIG. 8 is a chart comparing sequentially the forces required to install the improved self-riveting fastening element of this invention with prior fastening elements of this type. The X axis defines the travel of the plunger 60 in FIGS 4 to 7 above. The Y axis defines the force in thousands of pounds required for the installation of the fastening element 20 in the panel 52. Thus, the force required to install the improved self-riveting male fastening element 20 described above is shown by the dashed line 70 and the force requires to install an identical self-riveting male fastening element which does not include a conical exterior surface or relatively inclined interior and exterior surfaces (38 and 40) or a radial flange portion 24 having arcuate radially inwardly concave surfaces 46 is shown at 72. Otherwise, the fasteners tested were identical. First, it should be noted that the rate of increase of force required to install the improved self-riveting male fastening element 20 shown at 70 is relatively constant as compared to the force required to install a self-riveting male fastening element without the improvements as shown at 72. This is important because the force of the ram of a die press is generally constant. The arcuate line 74 represents one concave arcuate surface 56 of the die cavity which is plotted in FIG. 8 to permit determination of the status of the installation of the self-riveting male fastening element 20. At point 76, the radial flange portion 24 is first driven into the panel 54 just following the installation step shown in FIG. 6. The graph shown in FIG. 8 thus permits a direct comparison of the improved self-riveting fastening element of this invention with a fastening element of this type which does not include the improvements claimed herein.

More specifically, it should be noted from FIG. 8 that the force required for installation of the self-riveting fastening element prior to point 76 results solely from the radial deformation of the tubular riveting portion 22. As noted above, the force indicated by line 70 is relatively constant and significantly less than the force required to install a similar fastening element which does not include a conical external surface 40. For example, at point 78, the force required to install the improved self-riveting fastening element 20 of this invention is about twelve thousand pounds compared to about fifteen thousand pounds for a self-riveting fastening element which does not include a conical exterior surface 40 on the tubular riveting portion 22 or a tapered riveting portion. At point 80 where the radial flange portion 24 is being driven into the panel 52 and the free end of the radial flange portion 24 is deformed into the final hook-shape 66 as shown in FIG. 7, the force is reduced from greater than thirty-eight thousand pounds to about thirty-two thousand pounds as a result of the arcuate radially inwardly concave surfaces 46 on the exterior surface of the radial flange portion. Stated another way, it takes ten percent less energy to install a fastener of the improved design. As described above, these reductions is the force required to install the self-riveting fastening element 20 results in substantially less deformation of the radial flange portion 24 during the installation of the self-riveting fastening element of this invention and an improved fastening element and panel assembly. The final force at 82 is identical because the installation is now complete as shown in FIG. 7, wherein the radial flange portion 24, the entrapped portion 68 of the panel 52 and the hook-shape 66 is a metal to metal laminate. Any further force would result in an over-hit condition which should be avoided during installation.

Figure 9:
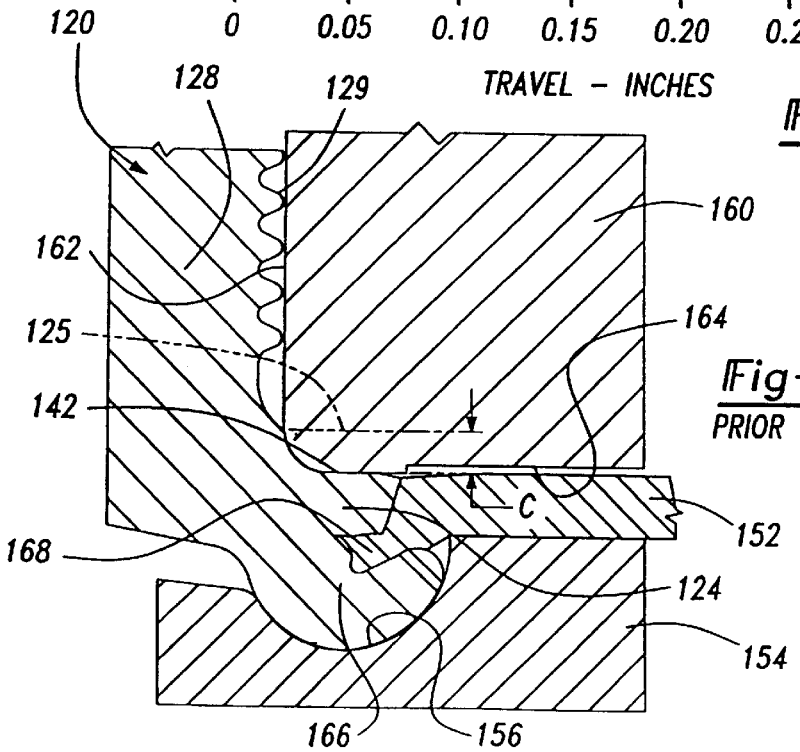
FIG. 9 is a partial side cross sectional view illustrating the installation of a fastening element in a panel which does not include the improvements claimed herein.

FIG. 9 illustrates the problems associated with an installation of a self-riveting fastening element 120 which does not include the improvements of this invention. That is, the tubular riveting portion does not include a conical exterior surface 40 and the flange does not include concave arcuate surfaces 46 between the convex arcuate edges 44 as described above in regard to FIGS. 1 to 7. The side surfaces are flat. Otherwise, the fastener 120 is identical to the fastener 20 described above. The force of installation of the self-riveting fastening element 120 is shown at 72 in FIG. 8 as described above.

FIG. 9 is similar to FIG. 7 except that it shows only the right hand side of the assembly. The plunger 160 and die member 154 are identical to the plunger 60 and die member S4 shown in FIGS. 4 to 7. As described above, the plunger 160 includes a bore 162 which receives the male threaded portion 128 of the fastening element 120. The male fastening portion 128 includes external threads 129 having a crest diameter slightly smaller than the internal diameter 162 of the plunger. As described above, the tubular barrel portion is deformed in the concave annular die surface 156 into a hook-shape 166 as the plunger drives the fastener 120 toward the die member 154. Further, the radial flange portion 124 is driven into the panel 152 as described. The greater force required to deform the tubular barrel portion into the hook-shaped end portion 166 and the greater force required to deform the flange portion 124 into the panel 152 as shown at 72 in FIG. 8 (compared to 70 for the fastener 20), deforms the radial flange portion 124 both radially and axially. In actual installations, the radial flange portion 124 is deformed axially a distance C as shown in FIG. 9. That is, the driven surface 142 was actually located at 125 prior to the installation, but this surface was deformed axially to the position shown in FIG. 9. Further, the flange portion 124 is deformed radially outwardly as shown. This permanent deformation of the radial flange portion results in reduced structural integrity of the fastening element and panel assembly and fewer applications of this type of fastening element in heavier gauge metal panels.

As will be understood by those skilled in the art, various modifications may be made to the self-riveting fastening element of this invention within the purview of the appended claims. For example, various male fastening portions 28 may be utilized including, for example, an unthreaded stud or ball joint or the improvements disclosed herein may be utilized in connection with female fastening elements wherein a threaded or unthreaded bore is provided through the body portion 26 of the fastening element. Features of this invention may also be used in self-piercing and riveting fasteners of the type described above. The self-riveting fastening element of this invention is particularly, but not exclusively adapted for mass production applications such as utilized by the automotive and appliance industries, wherein the fastener element may be installed, for example, in low carbon steel panels having a thickness ranging from about 0.08 to 0.25 inches or greater, such as SAE 1010 steel and the fastener may be formed of medium carbon steel, such as SAE 1035 steel and the fastener is preferably heat treated. As will be understood, however, the preferred material for the self-riveting fastening element of this invention will depend upon the application including the panel metal.

What is claimed is:

1. A method of attaching a fastening element to a metal panel, said fastening element including a tubular barrel portion having a free end including an arcuate outer surface and a radial flange portion integral with said tubular barrel portion opposite said free end, said tubular barrel portion having a generally cylindrical internal surface and a continuous, generally smooth conical external tape*red* surface extending from adjacent said radial flange to said arcuate outer surface such that the thickness of said tubular barrel portion adjacent said free end is less than the thickness adjacent said flange portion, said method comprising:

inserting said free end of said tubular barrel portion of said fastening element through [an opening in] said panel [having an internal diameter greater than an external diameter of said tubular barrel portion but less than an external diameter of said radial flange portion];

driving said tubular barrel portion free end into a female die having a concave annular die surface deforming said free end radially outwardly and upwardly into a hook-shape, said relatively tapered cylindrical internal and conical exterior surfaces of said barrel portion reducing the force required to radially deform said free end of said barrel portion; and deforming said radial flange portion into said panel [adjacent said panel opening].

2. The method of attaching a fastener to a metal panel as defined in claim 1, wherein said radial flange portion of said fastening element includes an outer surface having a plurality of spaced arcuate radially inwardly concave surfaces, said method including driving said radial flange portion into said panel [adjacent said panel opening] and simultaneously deforming said panel into said arcuate concave surfaces, thereby reducing the force required to drive said flange portion into said panel and increasing the torque required to turn said fastening element relative to said panel.

3. The method of attaching a fastening element to a metal panel as defined in claim 2, wherein said outer surface of said radial flange portion includes an arcuate convex surface located between each of said spaced arcuate radially inwardly concave surfaces, said method including driving said arcuate concave surfaces into said panel [adjacent said panel opening] as said panel is deformed into said arcuate concave surfaces.

4. A method of attaching a fastening element to a metal panel, said fastening element including a tubular barrel portion having a longitudinal axis and a free end and a radial flange portion integral with said tubular barrel portion opposite said free end, said radial flange portion including an outer surface having a plurality of spaced arcuate radially inwardly concave surfaces opening outwardly and a plurality of convex surfaces therebetween and said concave surfaces each having a radial surface extending[,] generally parallel to said longitudinal axis of said tubular barrel portion, said method comprising:

inserting said free end of said tubular barrel portion of said fastening element through [an opening in] said panel [having an internal diameter greater than an external diameter of said tubular barrel portion but less than an external diameter of said radial flange portion];

driving said tubular barrel portion free end into a female die having a concave annular die surface deforming said free end of said tubular banal portion radially outwardly; and deforming said radial flange portion into said panel [adjacent said panel opening] and said panel radially inwardly into said spaced arcuate radially inwardly concave surfaces on said outer surface of said flange portion, said concave and convex surfaces of said flange outer surface reducing the forces required to drive said flange portion into said panel and increasing the torque required to turn said fastening element relative to said panel.

5. The method of attaching a fastening element to a metal panel as defined in claim 4, wherein said outer surface of said radial flange portion includes an arcuate convex surface located between each of said spaced arcuate radially inwardly concave surfaces, said method including driving said arcuate concave surfaces into said panel [adjacent said panel opening] as said panel is deformed into said arcuate concave surfaces.

6. The method of attaching a fastening element to a metal panel as defined in claim 4, wherein said tubular barrel portion includes generally cylindrical internal and external surfaces relatively tapered toward said free end such that the thickness of said tubular barrel portion adjacent said free end is less than the thickness of said tubular banal portion adjacent said flange portion, said method including driving said tubular banal portion of said fastening element through said panel [opening] into said concave annular die surface of said female die and said relatively tapered internal and external surfaces of said tubular barrel portion reducing the forces required to deform said free end of said tubular barrel portion radially outwardly in said female die.

7. The method of attaching a fastening element to a metal panel as defined in claim 6, wherein said internal surface of said tubular portion is cylindrical and said external surface is tapered inwardly toward said free end, said method including driving said tapered external surface of said barrel portion through said panel [opening].

* * * * *

UNITED STATES PATENT AND TRADEMARK OFFICE

CERTIFICATE OF CORRECTION

PATENT NO. : Re 38,061 E
DATED : April 8, 2003
INVENTOR(S) : Ladouceur

It is certified that error appears in the above-identified patent and that said Letters Patent is hereby corrected as shown below:

Column 10,
Line 4, please change “forced” to -- force --.
Line 21, please change “banal” to -- barrel --.
Line 27, please change “forces” to -- force --.

Signed and Sealed this

Sixteenth Day of September, 2003

JAMES E. ROGAN
*Director of the United States Patent and Trademark Office*